United States Patent [19]

Hope et al.

[11] 3,994,380
[45] Nov. 30, 1976

[54] TRANSPORT ROLLER

[76] Inventors: Henry F. Hope; Stephen F. Hope; John A. Hope, all of 3192 Huntingdon Road, Huntingdon Valley, Pa. 19006

[22] Filed: Jan. 5, 1976

[21] Appl. No.: 646,630

[52] U.S. Cl. ................................... 193/37; 29/117; 198/780; 226/190; 271/272; 354/319
[51] Int. Cl.² ................................................ B65G 39/02
[58] Field of Search .............. 193/37; 198/127 R; 29/117; 271/272; 226/190; 354/302, 319

[56] References Cited

UNITED STATES PATENTS

| | | | |
|---|---|---|---|
| 2,638,282 | 5/1953 | Prevost | 29/117 |
| 3,270,577 | 9/1966 | Poundstone | 193/37 |
| 3,353,644 | 11/1967 | McNash et al. | 193/37 |

FOREIGN PATENTS OR APPLICATIONS

| | | | |
|---|---|---|---|
| 257,480 | 4/1964 | Australia | 193/37 |
| 1,357,264 | 6/1974 | United Kingdom | 193/37 |

*Primary Examiner*—Evon C. Blunk
*Assistant Examiner*—Jeffrey V. Nase
*Attorney, Agent, or Firm*—Z. T. Wobensmith, 2nd; Z. T. Wobensmith, III

[57] ABSTRACT

A transport roller is disclosed for advancing elongated strips of flat sheet material such as photographic film, paper and the like in tanks for chemical treatment, in driers and for other purposes which comprises a hollow tubular roller body having shafts extending from its ends, with an improved leakproof and quickly assembled shaft mounting being provided in expanded frictional engagement with the tube.

6 Claims, 6 Drawing Figures

U.S. Patent  Nov. 30, 1976  3,994,380
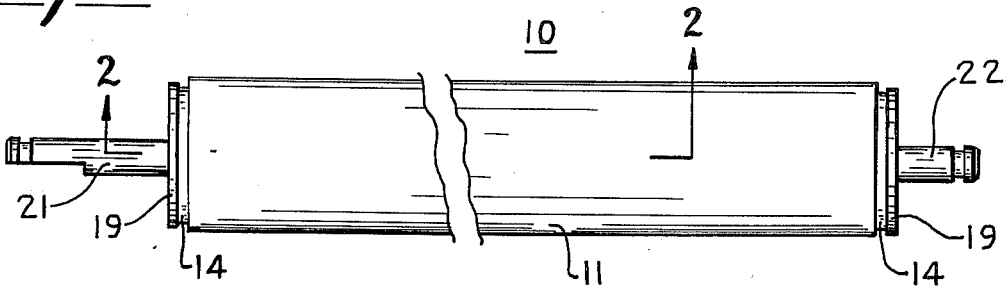
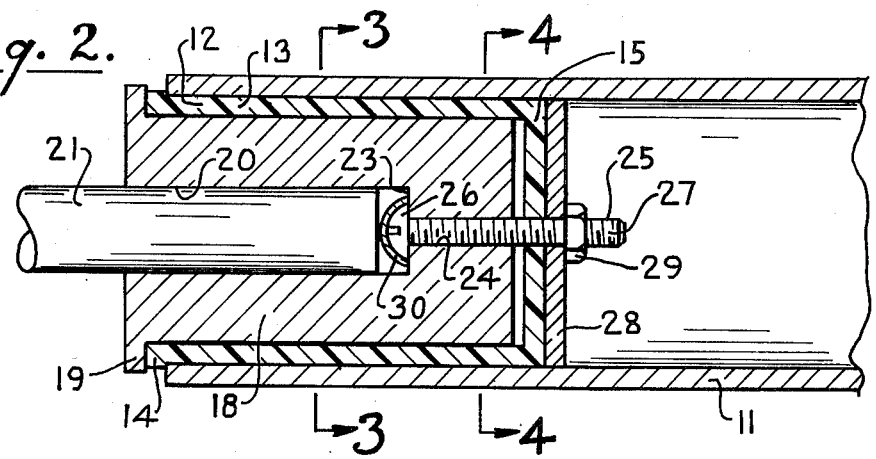
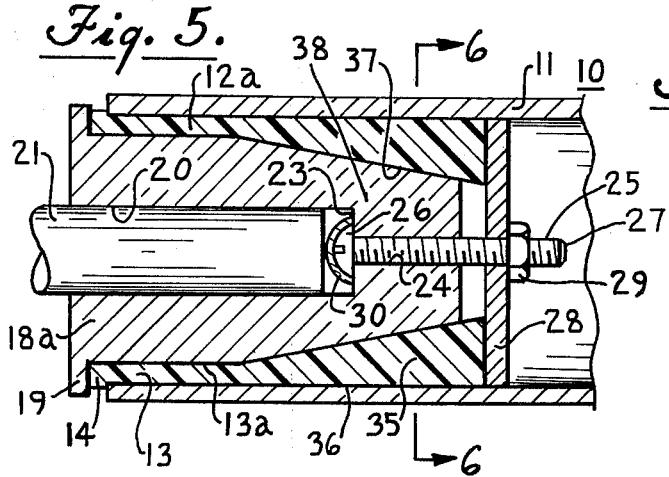
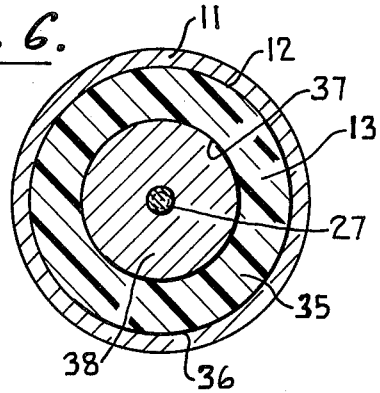
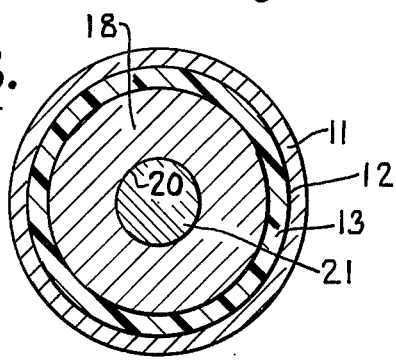
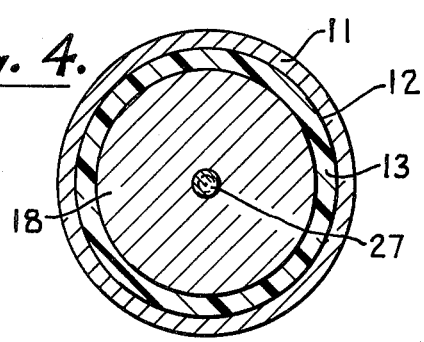

TRANSPORT ROLLER

BACKGROUND OF THE INVENTION

1. Field of the Invention

This invention relates to transport rollers for advancing elongated strips of thin flat material.

2. Brief Description of the Prior Art

It heretofore been proposed to provide transport rollers for photographic film, paper and the like of solid rods with end counterbores into which shafts are inserted and held against rotation with respect to the roller body. Such rollers have various shortcomings including excessive cost of labor and of material to manufacture. Such solid rollers also have a tendency to distort which is lacking in hollow rollers.

It has also been proposed to construct transport rollers of hollow tubular material with end inserts of molded plastic, the peripheries of which are secured to the interior of the tubular bodies by cementing, the inserts having central axial openings in which end shafts are carried. Such rollers are relatively expensive to construct and have a tendency to leak.

SUMMARY OF THE INVENTION synthetic accordance with the invention a transport roller is provided which includes a hollow cylindrical tube of paper, cardboard, synthetic plastic, metal, hard rubber, glass or other desired material with a hollow soft flexible insert at each end, with a plug in engagement with the insert, an inner end plate and screw in threaded engagement in the plate and mounted in the plug being provided to force the plug to compress the insert into gripping and fluid tight engagement with the inner surface of the tube. The insert can be cylindrical, with or without an inner end portion, or can have a tapered portion for engagement by a tapered end of the plug. The shafts at each end are secured in the end plugs.

It is the principal object of the invention to provide a transport roller which has improved operating characteristics, including freedom from leakage, which is simple and inexpensive to construct and which will have a long operating life.

It is a further object of the invention to provide an improved transport roller which is strong, light in weight and which has a wide range of usefulness.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which:

FIG. 1 is a view in elevation of a transport roller in accordance with the invention;

FIG. 2 is a longitudinal sectional view, enlarged, taken approximately on the line 2—2 of FIG. 1;

FIG. 3 is a transverse sectional view taken approximately on the line 3—3 of FIG. 2;

FIG. 4 is a transverse sectional view taken approximately on the line 4—4 of FIG. 2;

FIG. 5 is a view similar to FIG. 2 showing another embodiment of the invention; and FIG. 6 is a transverse sectional view taken approximately on the line 6—6 of FIG. 5.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to FIGS. 1 to 4 of the drawings a transport roller in accordance with the invention is shown generally at 10 and includes an elongated hollow cylindrical tube 11 of any preferred material. One suitable material is spirally wound paper or cardboard preferably impregnated with a phenolic or like resin and cured so that a relatively stiff tube is provided, resistant to wear, waterproof, and inert to many chemical solutions. Other suitable materials include tubes of synthetic plastic, metal, hard rubber and glass but these are more expensive and need only be employed where special circumstances call for their use.

At each end of the tube 11, one end only being shown for purposes of illustration, an insert 12 is provided. The insert 12 is of soft flexible water and chemical resistant material, capable of compression and resilient deformation, and for this purpose urethane, polyvinyl chloride or the like may be employed.

The insert 12 has a straight cylindrical portion 13 with an outer rim 14 extending at least partially over the end face of the tube 11. The insert 12 may, if desired, have an inner end wall 15 but for many uses such an end wall is not essential.

A plug 18 is provided, preferably of a relatively rigid material and may be synthetic plastic such as nylon. The plug has an outwardly extending rim 19, which extends in overlapping relation to the rim 4 of the insert 12.

A central longitudinal axial opening 20 is provided for the reception of the roller shafts 21 and 22 and has an inner end shoulder 23 from which a central longitudinally axial opening 24 of smaller diameter extends through the opposite end of the plug 18.

The opening 24 provides for the reception of a clamping screw 25, the head 26 of which engages the shoulder 23 and the shank 27 of which is in threaded engagement with a nut 29 engaging a clamping plate 28. The clamping plate 28 slidably engages the interior of the tube 11 and engages the insert 12. Upon tightening of the clamping screw 25 the rim 19 retains the rim 14 against displacement and the insert 12, between its ends, is compressed into fluid tight and gripping engagement with the exterior face of the plug 18 and the interior face of the tube 11. The clamping plate 28 may be bowed slightly by the force applied thereon.

It will be noted that the insert 11 can be compressed with or without the end wall 15 so long as sufficient length extends inwardly beyond the end of the plug 18 to be available for compression.

If desired, a sealant 30 may be applied in covering relation to the head 26 and the end shoulder 23 to prevent fluid leakage at this location but for low pressure, use of such sealant 30 is not usually required.

The shafts 21 and 22, upon the completion of the clamping of the plugs 18 in place are then inserted in the openings 20 and sealed in place in any desired manner such as by an adhesive.

Referring now more particularly to FIGS. 5 and 6, the insert 12a there shown has a rim 14, a straight cylindrical portion 13, and an inner end portion 35 with an outer cylindrical surface 36 and an inner conical surface 37.

The plug 18a has a short straight cylindrical portion 13a and a conical portion 38 engaging the conical surface 37 for compressing the insert 12a upon tightening of the clamping screw 25 engaged with the nut 29 bearing on clamping plate 28.

The plug 18 is thus firmly held in fluid tight and gripped relation with respect to the tube 11.

We claim:

1. A transport roller comprising
   an elongated hollow tubular body portion,
   an insert in said tubular portion having an outwardly extending rim in overlapped relation to the end of the tubular portion and in gripping engagement with the interior of the tubular portion,
   a plug member extending inwardly within the insert and having a rim in overlapped relation to the rim of the insert and closing the end of said tubular portion,
   a clamping plate in said tubular portion in engagement with an inner portion of said insert,
   a clamping member in engagement with said clamping plate and with said plug member and retaining said insert in gripping engagement with said plug and said tubular portion, and
   a shaft secured in said plug member in longitudinal axial relation to said tubular portion.

2. A transport roller as defined in claim 1 in which said insert has between its rim and its opposite end a hollow cylindrical portion.

3. A transport roller as defined in claim 2 in which said insert has a transverse inner end wall portion with which said clamping plate is in engagement.

4. A transport roller as defined in claim 1 in which said insert is of elastic deformable liquid proof material.

5. A transport roller as defined in claim 1 in which said plug is of relatively rigid liquid proof material.

6. A transport roller as defined in claim 1 in which said insert has an inner end portion with a cylindrical exterior surface and a conical interior surface, and said plug has a complemental surface for engagement with the conical interior surface of the insert.

* * * * *

UNITED STATES PATENT OFFICE
CERTIFICATE OF CORRECTION

Patent No. 3,994,380        Dated November 30, 1976

Inventor(s) Henry F. Hope; Stephen F. Hope; and John A. Hope

It is certified that error appears in the above-identified patent and that said Letters Patent are hereby corrected as shown below:

Column 1,

Line 26, before "accordance", delete "synthetic" and insert -- In --.

Column 2,

Line 38, after "rim", change "4" to -- 14 --.

Signed and Sealed this

Fifteenth Day of February 1977

[SEAL]

Attest:

RUTH C. MASON  
*Attesting Officer*

C. MARSHALL DANN  
*Commissioner of Patents and Trademarks*